UNITED STATES PATENT OFFICE.

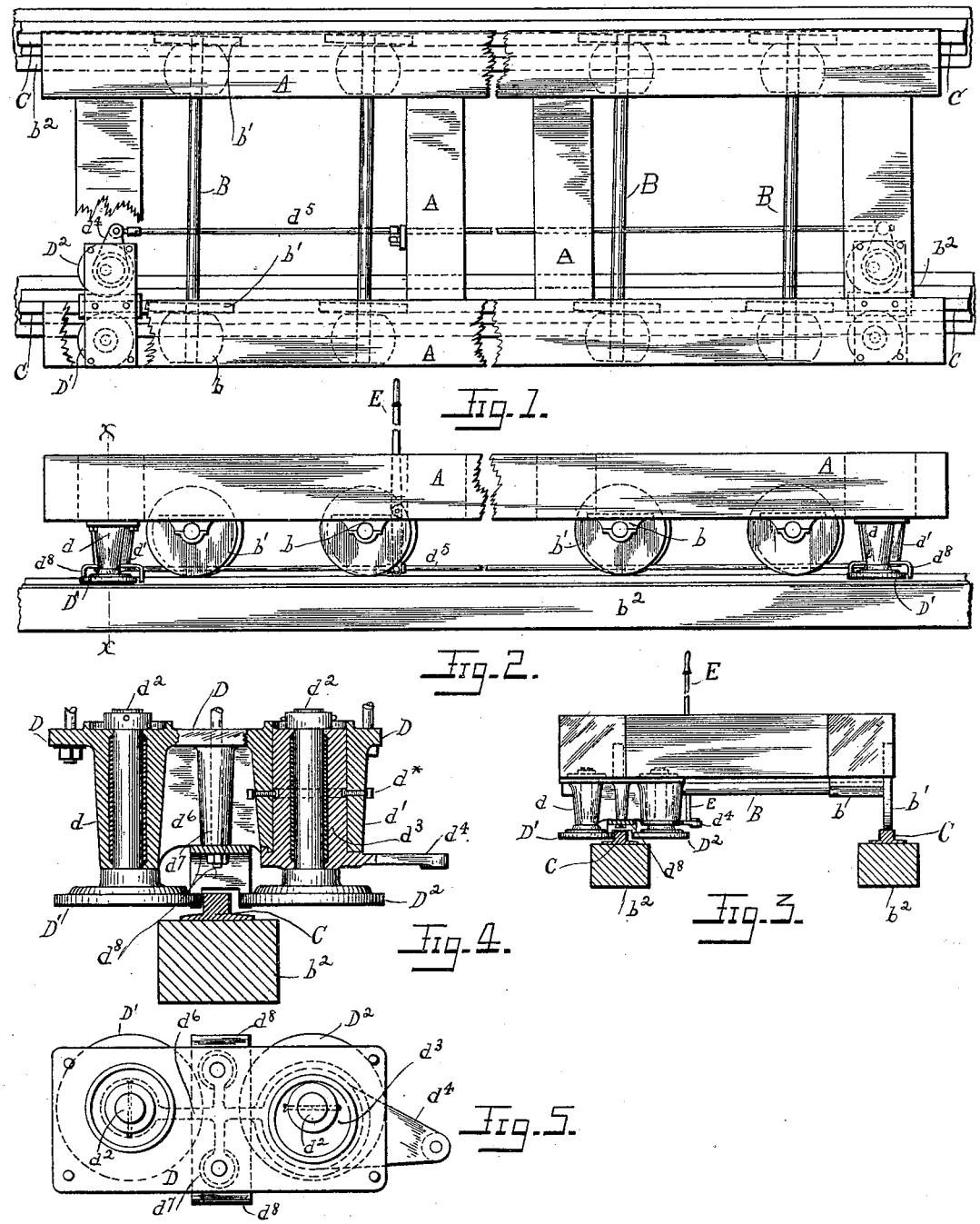

SAMUEL R. SMITH, OF CINCINNATI, OHIO.

SAWMILL-CARRIAGE.

SPECIFICATION forming part of Letters Patent No. 496,142, dated April 25, 1893.

Application filed November 19, 1892. Serial No. 452,489. (No model.)

*To all whom it may concern:*

Be it known that I, SAMUEL R. SMITH, a citizen of the United States, and a resident of Cincinnati, in the county of Hamilton and State of Ohio, have invented certain new and useful Improvements in Sawmill-Carriages, of which the following is a specification.

My invention relates to saw mill carriages. Its objects are to provide a simple and reliable means to automatically shift the log clear of the saw upon its return movement and return it to its working position, and to lock the carriage against shifting laterally when desired. These objects I attain by the means illustrated in the accompanying drawings, in connection with which, the invention will be first fully described, and then particularly referred to and pointed out in the claims.

Referring to the drawings in which liks parts are indicated by similar reference letters, wherever they occur throughout the various views. Figure 1 is a plan view of a saw mill carriage embodying my invention. Fig. 2 is a side elevation of the same. Fig. 3 is an end elevation of the same. Fig. 4 is an enlarged detail view in vertical section through line $x,x$, Fig. 2 of the guide wheels and track rail. Fig. 5 is a plan view of the parts shown in Fig. 4.

Referring to the parts A, is the frame work of the carriage, which may be of any approved construction, and provided with the customary means for securing the log in position. The frame is mounted upon axles B, which are arranged diagonally to the frame sides. The axles are fitted in bearings $b$, the upper plates of which are circular, to enter circular depressions in the under side of the side frame timbers, the purpose of making the plates circular, and setting them in circular depressions is to readily align the boxes before the plates are permanently secured in place, the axles are secured in their boxes against lateral movement in any well known manner, and upon them are secured the flat faced wheels $b'$.

The wheels travel upon the rails C, which are flat on top, having perpendicular sides, and outwardly projecting flanges, which rest upon and are secured to the track timbers $b^2$. The peripheries of the wheels are preferably chilled, and being flat across the faces, may be dressed perfectly true and smooth, by an emery wheel, thus saving the expense of turning.

To the under side of the carriage timbers at each end and upon one side are secured hanger plates D, which have bearings $d\ d'$ depending from them for the journals $d^2$ upon the lower ends of which are secured the guide wheels $D'\ D^2$ which are arranged to bear against the vertical sides of one of the track rails C.

In Figs. 2 and 3, one of the wheels $D'$ is shown as bearing against one side of the track rails C, while the opposite wheel stands away from the opposite side of the rail, in all of the views the carriage is supposed to be traveling forward, or to the left. The inclined position of the axles tends to drive the log against the saw, this tendency is prevented by the wheel $D'$ which guides it parallel to the track, so long as the carriage is on its forward movement, but so soon as its movement is reversed, the inclined position of the axles shifts the carriage laterally until stopped by the wheel $D^2$, coming against the opposite side of the rail, thus clearing the log from the saw, when the carriage will travel upon its return movement parallel with the rails until again reversed. The carriage should be allowed to travel in either direction until the saw has passed about one foot beyond the end of the log, while the carriage travels so far, upon being reversed, the log will be brought in proper working position on the forward movement and carried away from the saw, to allow sufficient clearance on the return. It is sometimes desirable to reverse the movement before the saw has completed its cut, and in such case, it should travel back in the same path, or, in other words, the lateral or offset movement of the carriage should be prevented. To accomplish this result, I have provided means to bring both of the wheels $D'\ D^2$ to bear against the vertical sides of the track. One of the depending hangers $D^2$ of each pair is larger than its companion and fitted with a bushing $d^3$ the bore of which is eccentric to the bore of the hanger. The bushing is held in place by screws $d^\times$ which pass through the wall of the hanger and enter a circumferential groove in the periphery of the bushing. The lower ends of the bushings $d^3$ have formed with, or secured to them, crank arms $d^4$, these arms are united by a coupling rod $d^5$. E is a shifting lever which is fulcrumed upon a stud pin in the timbers of the frame, and has its lower end coupled to shifting rod. When the lever is in the vertical position shown, the guide wheels $D^2$ are separated from the rail the reverse movement of the carriage will slide it laterally to obtain the proper offset and bring it back to its proper position at each end of its travel. But should it be desired to back the carriage before the saw has completed its cut, a movement of the lever from the perpendicular, will throw the wheels $D^2$ against the vertical side of the rail, the rail being thus embraced upon each side by the guide wheels, the carriage will be compelled to move back without moving laterally.

To prevent an unsteady movement of the hangers $d$ $d'$, I unite them by the web $d^6$, which has cross branches projecting centrally from it, as seen in dotted line Fig. 5; at the ends of these branches are perforated bosses $d^7$, which receive bolts that pass through them, the frame timbers and the U shaped angle plate $d^8$, the edges of which are notched to pass over the rails, The upper ends of the journals are fitted with collars to hold them in a proper position. The collars are surrounded by upwardly projecting annular flanges, which retain the oil to keep the journals lubricated. The downwardly projecting notched lugs of the angle plate $d^8$ serve as scrapers to prevent bark, or other waste material from getting between the guide wheels and track rail against which they may be bearing, and disturbing the position of the carriage.

As the means for checking the offset is seldom needed it is obvious that both the guide wheel journals may be fitted in rigid boxings like the bearings for the journals of wheels $D'$ and for very long carriages, one or more sets of such rigidly mounted wheels should be employed between the ones having the movable guide wheels, which are placed under each end of the carriage. It is also obvious that any well known shifting bearing might be employed instead of the bearings for the wheel $D^2$, but the eccentrically mounted bearing for said wheels is deemed the best.

What I claim as new, and desire to secure by Letters Patent, is—

1. The combination of the carriage frame, the diagonally inclined axles, the track wheels, and the guide wheels depending from the carriage, and adapted to bear alternately upon opposite sides of the track rail as the carriage moves forward and back, substantially as shown and described.

2. The combination of the carriage, the inclined axles, the flat truck wheels, the rails C, the hanger plate D secured to the carriage, the hangers depending from said plate upon opposite sides of the track rails, the guide wheels upon shafts journaled in said hangers and adapted to roll against one or the other side of said track rail and guide the carriage, whereby the log is automatically brought and kept in proper position for the saw in its forward movement, and offset from the log upon its return, substantially as specified.

3. The carriage truck having inclined axles and flat wheels, the rails having flat tops and perpendicular sides in combination with the hangers depending from the carriage the guide wheels carried in said hangers and projecting down to bear upon opposite sides of the track rail, the bearings for the wheels upon one side of the track being movably mounted and means such as shown to move the bearings to bring said wheels against the side of the track for the purpose of checking the offset movement when desired substantially as shown and described.

4. The combination of the carriage frame, the diagonally arranged axles, the track wheels and rectangular track rails with the hanger plate D secured to the under side of the carriage, the depending hangers $d$, $d'$ from said plate, the eccentrically bored bushing $d^3$ fitted to turn in the hanger $d'$ and having laterally extended arm $d^4$, the guide wheels $D'$ $D^2$ carried by said hangers and arranged upon opposite sides of the track rail, the coupling rod, $d^5$, and shifting lever E, for turning the bushing $d^3$, and bringing the wheel $D^2$ against the side of the track upon the forward movement of the carriage for the purpose of checking the lateral movement of the carriage should its forward movement be reversed.

SAMUEL R. SMITH.

Witnesses:
CHAS. F. GESSERT,
GEO. J. MURRAY.